July 8, 1952 J. H. STROOP 2,602,463
VALVE FITTING AND SIPHON TUBE
Filed May 7, 1946

INVENTOR.
John H. Stroop
BY
J. William Carson
ATTORNEY

Patented July 8, 1952

2,602,463

UNITED STATES PATENT OFFICE 2,602,463

VALVE FITTING AND SIPHON TUBE

John H. Stroop, New York, N. Y., assignor to Specialties Development Corporation, Belleville, N. J., a corporation of New Jersey Application May 7, 1946, Serial No. 667,901

1 Claim. (Cl. 137—327)

This invention relates to means for controlling the discharge of fluid media under pressure, and, more particularly, to discharge heads or valves for high pressure fluid media containers.

Containers, commonly known as cylinders, for high pressure fluid media such as carbon dioxide and the like are provided with a threaded opening in the neck thereof into which the threaded shank of a discharge head or valve is tightly screwed. Preparatory to refilling a cylinder, it is customary to remove the valve, clean and inspect the interior of the cylinder and the valve and screw the valve into the opening again. Since the shank of the valve is tightly lodged in the cylinder opening, a considerable torque is required to unscrew the same. Usually, this is accomplished by holding the cylinder in a vise, applying a chuck, adapted to receive the valve, and rotating the chuck by means of a lathe. In many instances, it has been found that the force applied to unscrew the valve twisted or distorted the valve so that its working parts would not operate properly after being reassembled, or weakened or damaged the body of the valve to such an extent that further use thereof was unsafe. As a result, many valves required replacement after being removed from cylinders which increased the cost of refilling cylinders.

Accordingly, an object of the present invention is to provide a valve which can be removed and secured without encountering the foregoing difficulties and objections.

Another object is to provide a valve constructed of simple parts which are readily manufactured and assembled to provide a compact valve construction.

A further object is to provide a valve which permits access to the interior of the cylinder without completely removing the valve from the cylinder.

Other and further objects of the invention will be obvious upon an understanding of the illustrative embodiment about to be described, or will be indicated in the appended claim, and various advantages not referred to herein will occur to one skilled in the art upon employment of the invention in practice.

A preferred embodiment of the invention has been chosen for purposes of illustration and description and is shown in the accompanying drawing, forming a part of the specification, wherein.

Figure 1:
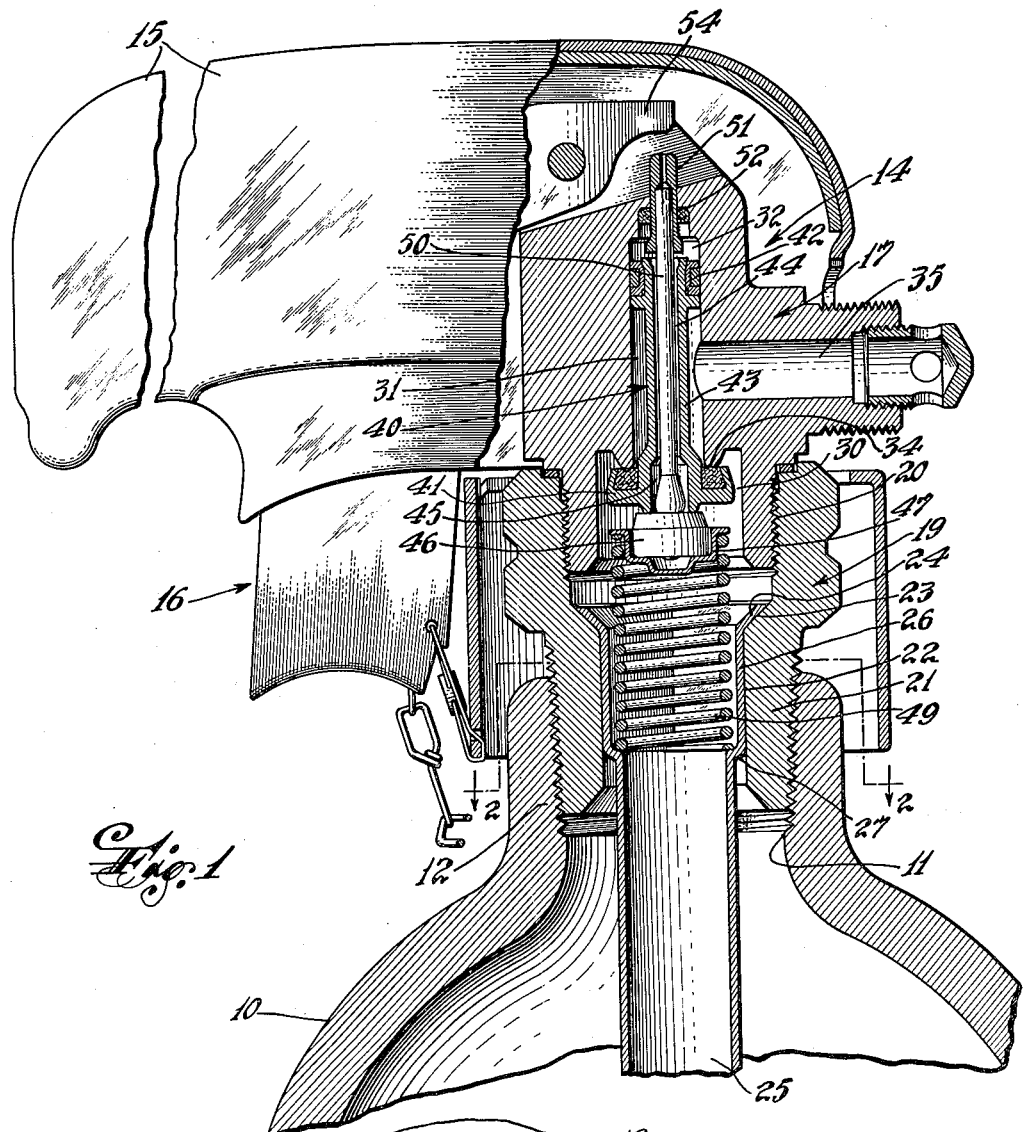
Figure 1 is a fragmentary elevational view, partly in section, of a valve in accordance with the invention shown as applied to a container.

Referring to the drawing, there is shown a portion of a container or cylinder 10 for storing fluid media under pressure, such as carbon dioxide, having a threaded opening 11 in the neck 12 thereof, a discharge head or valve 14 mounted on the cylinder, a carrying handle 15 secured to the valve, and valve operating means 16 supported by the handle.

Figure 2:
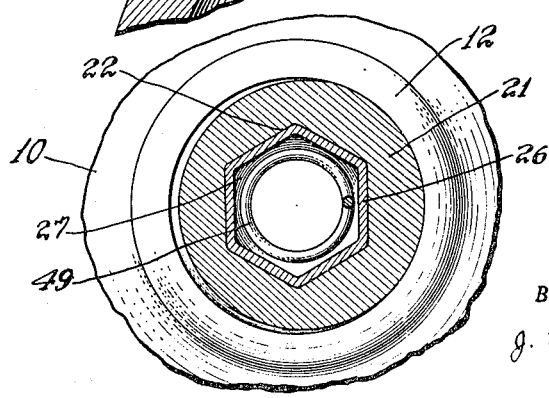
Figure 2 is a sectional view taken along the line 2—2 on Figure 1, illustrating a detail of the valve.

The valve has a body or housing comprising an upper section 17 and a lower section 19 detachably secured together by cooperating screw threads 20. The lower section has a threaded nipple or shank portion 21 removably secured in the opening 11 and has a non-circular longitudinally extending bore 22, preferably hexagonal in cross-section (Figure 2), providing a wrench receiving portion to facilitate securement and removal of the lower valve section.

A shoulder 23 is provided above the bore 22 for seating a flange 24 on the upper end of a syphon tube 25 extending through the bore to the bottom of the container. The syphon tube has a non-circular enlarged portion 26 at its upper end conforming to the shape of the bore 22 and is formed with an inwardly extending shoulder 27, the purpose of which will be described hereinafter.

The upper section 17 of the valve body comprises a valve chamber 30, a longitudinally extending bore 31 provided at its upper end with a piston cylinder 32, a valve seat 34 surrounding the lower end of the bore 31, and an outlet conduit 35 in fluid flow communication with the bore 31 intermediate the cylinder 32 and the seat 34. The diameter of the piston cylinder may be equal to or at least no greater than the diameter of the bore adjacent the seat, but preferably is slightly smaller as shown.

A valve and piston assembly 40 for controlling the discharge of fluid pressure medium from the cylinder comprises a main valve member 41 for the seat 34, a piston 42 disposed in the cylinder 32, and a stem 43 connecting the valve member and the piston. The stem has a bore 44 extending therethrough formed with a pilot valve port 45 in the main valve member for establishing fluid flow communication between the valve chamber 30 and the piston cylinder 32. A pilot valve member 46, seated in a flanged cup 47, is urged towards its port 45 by a cylindrical spring 49 compressed between the flange of the cup 47 and the shoulder 27 of the syphon tube.

A loosely fitting rod 50 is slidably disposed in the bore 44 of the piston and valve assembly and carries an apertured cap member 51 at its upper end extending through a packed aperture 52 in the top wall of the upper section 17.

The cap member 51 is adapted to be moved downwardly by the operating means 16, herein illustrated as a trigger mechanism having an arm 54 for engaging the cap member, whereby the rod 50 is moved downwardly to unseat the pilot valve member 46.

In operation, upon unseating of the pilot valve member, pressure medium from the valve chamber 30 is conducted to the piston cylinder and is effective to substantially balance the pressure acting on both sides of the main valve member 41, whereby unseating of the main valve member requires only a slight force. Such unseating of the main valve member is effected by further operation of the trigger mechanism which causes the cap member to engage the top of the valve and piston assembly to move the assembly downwardly, whereby pressure medium is discharged from the cylinder 10 by way of the syphon tube 25, the valve chamber 30, the bore 31 and the outlet conduit 35.

During the foregoing operation, the aperture of the cap member 51 is sealed to prevent the escape of fluid medium therethrough. However, upon releasing the trigger mechanism, the aperture in the cap member 51 is adapted to vent the fluid medium in the piston cylinder to reduce its pressure, whereby the combined forces of the medium acting on the main and pilot valve members and of the spring 49 effect seating of the pilot and main valve members to stop the discharge of the pressure medium.

The valve preferably is assembled by screwing the lower body section 19 into the neck opening of the cylinder 10 with the aid of a wrench or tool fitted into the non-circular bore 22. The syphon 25 is then inserted and positioned with its flange 24 on the shoulder 23 and the spring 49 is seated on the shoulder 27 with the cup 47 containing the pilot valve member 46 in turn seated on the spring 49. The cap member 51, the rod 50 and the piston and valve assembly 40 are placed in the upper valve body section 17 and this section is screwed to the lower section 19. The handle 15 containing the operating means 16 then is attached to valve body.

In order to remove the valve for inspection and for inspection and cleaning of the cylinder, the foregoing steps are performed in reverse order. Since the syphon tube is readily removed to permit access to the cylinder opening, it is not necessary in every instance to remove the lower valve body section. However, if removal of the latter is desired, this is readily accomplished by again inserting a wrench or tool in the bore 22 and unscrewing the lower section. Such unscrewing, by reason of the wrench being applied internally over a wide area along the length of the bore, will not subject the lower section to excessive torsional strains tending to twist or otherwise damage the valve body section.

From the foregoing description, it will be seen that the present invention provides an improved valve which is simple in operation, is extremely compact in arrangement and is readily secured to and removed from the cylinder. It will be noted that the valve body sections can be made from castings which are machined by simple drilling, boring and threading operations readily performed by automatic machines. The piston chamber is in the form of a simple bore and does not complicate the structure. Also, the provision of a unitary main valve and piston assembly simplifies the construction of the valve. The valve can readily withstand any rough usage to which it may be subjected.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

In a valve, a valve body comprising upper and lower sections, said upper section having an externally threaded portion at the lower end thereof, said lower section having an externally threaded shank at the lower end thereof for removably securing the same into a threaded container opening and having a bore extending longitudinally therethrough, said bore being provided with a polygonal cross-sectioned portion adjacent the lower end for receiving a wrench for effecting securement and removal of said lower body section with respect to the container and being provided with an enlarged internally threaded portion adjacent the upper end for removably securing the threaded portion of said upper body section to said lower body section and being provided with an intermediate upwardly facing annular shoulder; and a syphon tube having a polygonal cross-sectioned enlarged portion at the upper end thereof disposed in said polygonal bore portion and provided with a flange at its upper end supported on said shoulder.

JOHN H. STROOP.

REFERENCES CITED

The following references are of record in the file of this patent:

UNITED STATES PATENTS

| Number | Name | Date |
|---|---|---|
| 650,413 | O'Neill | May 29, 1900 |
| 710,674 | Fassman | Oct. 7, 1902 |
| 1,037,680 | Spitzenberg | Sept. 3, 1912 |
| 1,132,886 | Stewart | Mar. 23, 1915 |
| 1,324,206 | Nickell | Dec. 9, 1919 |
| 1,589,786 | Bradshaw | June 22, 1926 |
| 1,836,384 | Mohr | Dec. 15, 1931 |
| 2,019,404 | Eugster | Oct. 29, 1935 |
| 2,172,073 | Smith | Sept. 5, 1939 |
| 2,273,856 | Freygang | Feb. 24, 1942 |
| 2,336,282 | Mueller | Dec. 7, 1943 |
| 2,363,943 | Carlson | Nov. 28, 1944 |
| 2,372,392 | Pletman | Mar. 27, 1945 |
| 2,408,541 | Wilson | Oct. 1, 1946 |